United States Patent
Jeon et al.

(10) Patent No.: US 12,271,629 B2
(45) Date of Patent: Apr. 8, 2025

(54) COMPUTER SYSTEM PERFORMING GARBAGE COLLECTION AND METHOD OF OPERATING THE SAME

(71) Applicant: SK hynix Inc., Gyeonggi-do (KR)

(72) Inventors: Jeong Ho Jeon, Gyeonggi-do (KR); Kang Rak Kwon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 121 days.

(21) Appl. No.: 18/081,519

(22) Filed: Dec. 14, 2022

(65) Prior Publication Data

US 2023/0401006 A1    Dec. 14, 2023

(30) Foreign Application Priority Data

Jun. 8, 2022 (KR) .................. 10-2022-0069776

(51) Int. Cl.
  *G06F 3/06* (2006.01)
  *G06F 12/02* (2006.01)

(52) U.S. Cl.
  CPC .......... *G06F 3/0659* (2013.01); *G06F 3/0607* (2013.01); *G06F 3/064* (2013.01); *G06F 12/0253* (2013.01); *G06F 3/0679* (2013.01)

(58) Field of Classification Search
  CPC ............. G06F 12/0246; G06F 12/0253; G06F 2212/7205; G06F 3/0607; G06F 3/061; G06F 3/064; G06F 3/0659; G06F 3/0679
  See application file for complete search history.

(56) References Cited

U.S. PATENT DOCUMENTS

| | | | | |
|---|---|---|---|---|
| 2017/0371781 A1* | 12/2017 | Choi | ................. | G06F 3/064 |
| 2019/0146679 A1* | 5/2019 | Doh | ................. | G06F 3/0659 |
| | | | | 711/103 |
| 2021/0216239 A1* | 7/2021 | Dutta | ................. | G06F 3/0604 |
| 2021/0397367 A1* | 12/2021 | Kang | ................. | G06F 12/0246 |

FOREIGN PATENT DOCUMENTS

| | | |
|---|---|---|
| KR | 10-2013-0142103 A | 12/2013 |
| KR | 10-2015-0139112 A | 12/2015 |
| KR | 10-2016-0049200 | 5/2016 |
| KR | 10-2019-0076256 | 7/2019 |
| KR | 10-2020-0014175 | 2/2020 |
| KR | 10-2020-0113547 | 10/2020 |
| KR | 10-2020-0142393 A | 12/2020 |

OTHER PUBLICATIONS

NVM Express™ Base Specification, NVM Express™ Revision 1.4b, Sep. 21, 2020, pp. 1-406, NVM Express, Inc., USA.

* cited by examiner

*Primary Examiner* — Jane W Benner
(74) *Attorney, Agent, or Firm* — IP & T GROUP LLP

(57) ABSTRACT

The present technology relates to an electronic device. According to the present technology, a host device may include a garbage collection controller and an idle time processor. The garbage collection controller may provide, to a storage device, a health information request command for requesting health information including a host write amount and a storage device write amount, provide, to the storage device, a first garbage collection control command for requesting garbage collection cost information based on the health information, provide, to the storage device, a second garbage collection control command for instructing to perform garbage collection based on the garbage collection cost information and an idle time of the storage device. The idle time processor may process information on the idle time.

20 Claims, 16 Drawing Sheets

FIG. 5

| HINF | |
|---|---|
| Host Write | data that the host has written to the memory controller |
| Device Write | data written to the memory device by the memory controller |

FIG. 6

Get Log Page – SMART / Health Information Log

| Bytes | Description |
|---|---|
| 47:32 | Data Units Read: Contains the number of 512 byte data units the host has read from the controller; this value does not include metadata. This value is reported in thousands (i.e., a value of 1 corresponds to 1,000 units of 512 bytes read) and is rounded up (e.g., one indicates the that number of 512 byte data units read is from 1 to 1,000, three indicates that the number of 512 byte data units read is from 2,001 to 3,000). When the LBA size is a value other than 512 bytes, the controller shall convert the amount of data read to 512 byte units. For the NVM command set, logical blocks read as part of Compare, Read, and Verify operations shall be included in this value. A value of 0h in this field indicates that the number of Data Units Read is not reported |
| 63:48 | Data Units Written: Contains the number of 512 byte data units the host has written to the controller; this value does not include metadata. This value is reported in thousands (i.e., a value of 1 corresponds to 1,000 units of 512 bytes written) and is rounded up (e.g., one indicates that the number of 512 byte data units written is from 1 to 1,000, three indicates that the number of 512 byte data units written is from 2,001 to 3,000). When the LBA size is a value other than 512 bytes, the controller shall convert the amount of data written to 512 byte units. For the NVM command set, logical blocks written as part of Write operations shall be included in this value. Write Uncorrectable commands shall not impact this value. A value of 0h in this field indicates that the number of Data Units Written is not reported |
| 79:64 | Host Read Commands: Contains the number of read commands completed by the controller. For the NVM command set, this value is the sum of the number of Compare commands and the number of Read commands. |
| 95:80 | Host Write Commands: Contains the number of write commands completed by the controller. For the NVM command set, this is the number of Write commands. |
| 111:96 | Controller Busy Time: Contains the amount of time the controller is busy with I/O commands. The controller is busy when there is a command outstanding to an I/O Queue (specifically, a command was issued via an I/O Submission Queue Tail doorbell write and the corresponding completion queue entry has not been posted yet to the associated I/O Completion Queue). This value is reported in minutes. |

FIG. 7

| GCCTL_CMD ||
|---|---|
| Value | Operation |
| 0 | Return GCC_INF |
| 1 | Perform GC |

| Free Block Throughput Table ||
|---|---|
| IPC value (X) | # of EFBLK |
| $Y1 \leq X < Y2$ | Z1 |
| $Y2 \leq X < Y3$ | Z2 |
| ⋮ | ⋮ |
| $Yn \leq X < Y(n+1)$ | Zn |

| GCC_INF ||
|---|---|
| Number of Estimate Free Block | 10 |
| Estimated Time | 5 |
| Garbage Collection Unit Time | 5/10=0.5 |

| GC ||
|---|---|
| Idle Time | Target Free Block |
| 0.2 | 0 |
| 0.7 | 1 |
| 10 | 10 |

COMPUTER SYSTEM PERFORMING GARBAGE COLLECTION AND METHOD OF OPERATING THE SAME

CROSS-REFERENCE TO RELATED APPLICATION

The present application claims priority under 35 U.S.C. § 119(a) to Korean patent application number 10-2022-0069776, filed on Jun. 8, 2022, the entire disclosure of which is incorporated herein by reference.

BACKGROUND

Field of Invention

The present disclosure relates to an electronic device, and more particularly, to a computing system and a method of operating the same.

Description of Related Art

A storage device is a device that stores data under control of a host device such as a computer or a smartphone. The storage device may include a memory device in which data is stored and a memory controller controlling the memory device. The memory device is divided into a volatile memory device and a nonvolatile memory device.

The volatile memory device is a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

The host may predict a garbage collection demand for the storage device based on health information received from the storage device. The host may improve performance of the storage device by controlling the storage device to preemptively perform garbage collection in consideration of a garbage collection cost and an idle time of the storage device.

SUMMARY

An embodiment of the present disclosure provides a computing system and a method of operating the same increasing performance by performing garbage collection on a storage device in advance.

According to an embodiment of the present disclosure, a host device may include a garbage collection controller and an idle time processor. The garbage collection controller may provide, to a storage device, a health information request command for requesting health information including a host write amount and a storage device write amount, provide, to the storage device, a first garbage collection control command for requesting garbage collection cost information based on the health information, provide, to the storage device, a second garbage collection control command for instructing to perform garbage collection based on the garbage collection cost information and an idle time of the storage device. The idle time processor may process information on the idle time.

According to an embodiment of the present disclosure, a method of operating a host device may include providing, to a storage device, a health information request command for requesting health information including a host write amount and a storage device write amount to a storage device, providing, to the storage device, a first garbage collection control command for requesting garbage collection cost information based on the health information received from the storage device, and providing, to the storage device, a second garbage collection control command instructing to perform garbage collection based on the garbage collection cost information and an idle time of the storage device.

According to an embodiment of the present disclosure, a storage device may include a memory device and a memory controller. The memory device may include a plurality of memory blocks. The memory controller may provide, in response to a health information request command from an external device, the external device with health information including an external device write amount and a storage device write amount, provide, in response to a first garbage collection control command from the external device, the external device with garbage collection cost information including an expected number of free blocks to be secured by garbage collection, and perform the garbage collection on the memory device in response to a second garbage collection control command from the external device.

According to an embodiment of an operating method of a controller, the operating method comprises providing, in response to a first request, a host with first information representing an accumulated amount of data provided thereto from the host and an accumulated amount of data occupying a storage space of a memory device, providing, in response to a second request, the host with second information representing a number of candidate memory blocks expected to become free through a garbage collection operation and an expected time amount required for the garbage collection operation, the number of candidate memory blocks being expected thereby based on a number of invalid pages, and controlling, in response to a third request, the memory device to perform the garbage collection operation on a number of target memory blocks, which is determined by the host based on the second information. Each of the first to third requests is provided from the host.

According to an embodiment of an operating method of a host device, the operating method comprises requesting, to a memory system, first information representing a first accumulated amount of data provided therefrom to the memory system and a second accumulated amount of data occupying a storage space of the memory system, requesting, to the memory system and when the second accumulated amount is determined thereby as greater than the first accumulated amount, second information representing a number of candidate memory blocks expected to become free through a garbage collection operation and an expected time amount required for the garbage collection operation, and requesting, to the memory system, the garbage collection operation on a number of target memory blocks, which is determined thereby based on the second information.

According to the present technology, a memory controller and a method of operating the same, and a computing system and a method of operating the same which increase performance by performing garbage collection on a storage device in advance, are provided.

BRIEF DESCRIPTION OF THE DRAWINGS

FIG. 5 is a diagram illustrating health information according to an embodiment of the present disclosure.

FIG. 6 is a diagram illustrating a smart health information log according to an embodiment of the present disclosure.

FIG. 7 is a diagram illustrating a garbage collection control command according to an embodiment of the present disclosure.

DETAILED DESCRIPTION

Specific structural or functional descriptions of embodiments according to the concepts which are disclosed in the present specification are illustrated only to describe the embodiments according to the concepts of the present disclosure. The embodiments according to the concepts of the present disclosure may be carried out in various forms and should not be construed as being limited to the embodiments described in the present specification.

Figure 1:
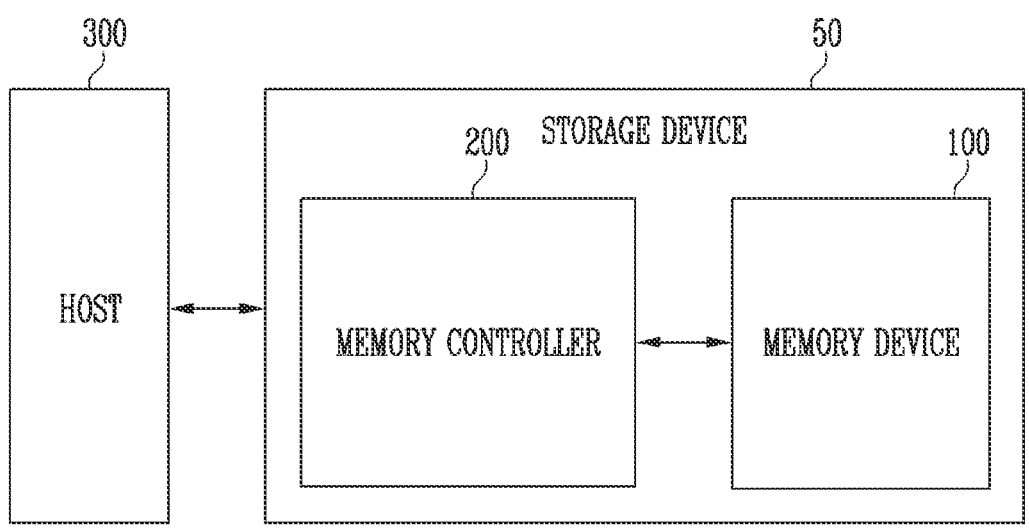
FIG. 1 is a diagram illustrating a computing system according to an embodiment of the present disclosure.

FIG. 1 is a diagram illustrating a computing system according to an embodiment of the present disclosure.

Referring to FIG. 1, the computing system may include a storage device 50 and a host 300.

The storage device 50 may include a memory device 100 and a memory controller 200 that controls an operation of the memory device. The storage device 50 is a device that stores data under control of the host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the LBA into a physical block address (PBA) indicating an address of memory cells in which data included in the memory device 100 is to be stored.

The memory controller 200 may control the memory device 100 to perform the program operation, the read operation, or the erase operation in response to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. In this case, the memory controller 200 may control the memory devices 100 according to an interleaving method to improve operation performance. The interleaving method may be an operation method for overlapping operation periods of at least two memory devices 100.

The memory controller 200 may control a plurality of memory devices 100 connected through at least one or more channels. Each memory device 100 may include at least one or more planes. Each plane may include a plurality of memory blocks.

The memory controller 200 may store health information and memory block information.

The health information may include a host write amount and a storage device write amount. The host write amount may be an amount of data corresponding to a write command provided from the host 300 to the memory controller 200. The host write amount may be an amount of write data completed by write commands received from the host 300 from a power on time of the storage device 50. The host write amount may reset whenever power of the storage device 50 is turned off and on. The storage device write amount may be an amount of data corresponding to a write operation performed in the memory device 100. The storage device write amount may be an amount of write data completed by write operations in the storage device 50 from a power on time of the storage device 50. The storage write amount may reset whenever power of the storage device 50 is turned off and on. The health information may include a host read amount, a storage device read amount, and a busy time of the storage device 50. The busy time of the storage device 50 indicates time during which the storage device 50 performs operation requested by the host 300 not requested by the storage device 50 itself. The host read amount may be an amount of data corresponding to a read command provided from the host 300 to the memory controller 200. The storage device read amount may be an amount of data corresponding to a read operation performed in the memory device 100.

The memory block information may include information on the plurality of memory blocks included in the memory device 100. The memory block information may include the number of pages storing invalid data among the plurality of pages included in the memory block.

The memory controller 200 may provide the health information to the host 300 in response to a health information request command received from the host 300. The memory controller 200 may provide garbage collection cost information to the host 300 in response to a first garbage collection control command received from the host 300. The garbage collection cost information may include the expected number of free blocks to be secured through garbage collection among the plurality of memory blocks and an expected time of the garbage collection. The memory controller 200 may calculate the expected number of free blocks and the expected time based on an invalid data page count included in the memory block information. The memory controller 200 may perform the garbage collection on the memory device 100 in response to a second garbage collection control command received from the host 300.

The health information request command may include a get parameter command for requesting register information of the storage device 50. The first and second garbage collection control commands may include a set parameter command for setting the register information of the storage device 50.

The host 300 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), a load reduced DIMM (LRDIMM), and an SM-BUS which is one type of an inter-integrated circuit communication.

The host 300 may provide the health information request command for requesting the health information including the host write amount and the storage device write amount to the memory controller 200. The host 300 may predict a garbage collection demand of the storage device 50 based on the health information. When the storage device write amount is greater than the host write amount, the host 300 may recognize the garbage collection demand. In a case where the storage device write amount is greater than the host write amount, the case may indicate that a large number of write operations are internally performed in the storage device 50, which causes an increase of the number of invalid data pages, and thus the case may indicate that the garbage collection is highly required to be performed. When the garbage collection demand is recognized, the host 300 may provide the first garbage collection control command for requesting the garbage collection cost information to the memory controller 200.

The host 300 may provide the second garbage collection control command instructing to perform the garbage collection based on the garbage collection cost information and an idle time of the storage device 50 to the memory controller 200. The host 300 may provide the second garbage collection control command to the memory controller 200 based on a comparison result of a garbage collection unit time and the idle time of the storage device 50. The garbage collection unit time may be an expected time required to secure one free block. The garbage collection unit time may be calculated based on the expected number of free blocks and the expected time included in the garbage collection cost information. When the idle time is greater than the garbage collection unit time, the host 300 may provide the second garbage collection control command to the memory controller 200. The host 300 may calculate the number of target free blocks to be secured through the garbage collection based on the comparison result of the garbage collection unit time and the idle time of the storage device 50. The host 300 may provide information including the number of target free blocks and the second garbage collection control command to the memory controller 200.

The host 300 may calculate the idle time of the storage device 50 based on an input and output command provided to the memory controller 200. The idle time of the storage device 50 may be a time in which all operations according to the request of the host 300 are completed and the memory controller 200 waits for reception of the request of the host 300. Specifically, the host 300 may calculate the idle time by measuring time from when the host 300 receives a response of a last command from the storage device 50 to when the host 300 sends a request of a new next command to the storage device 50.

Figure 2:
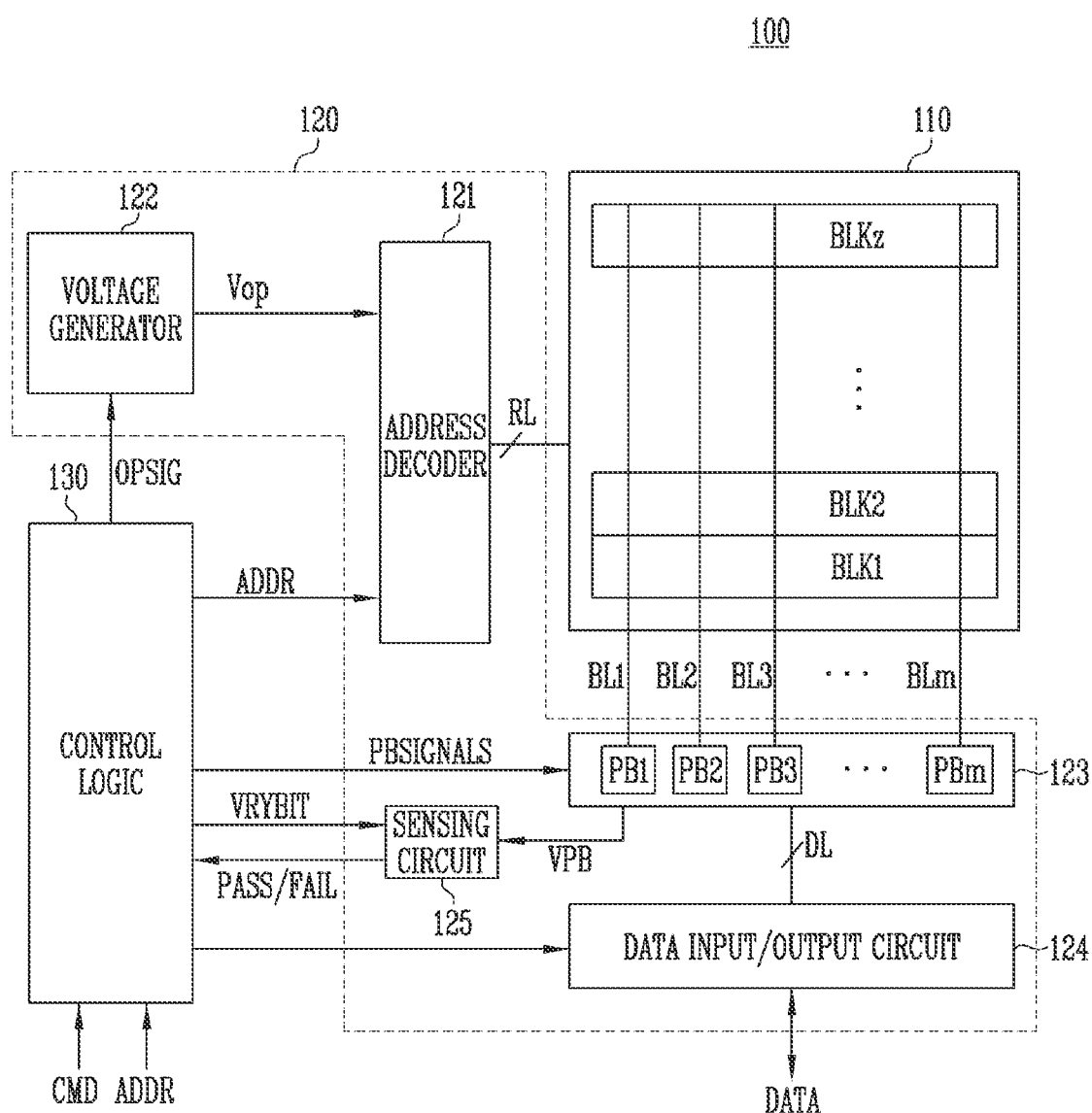
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells, and between a source select transistor and the memory cells.

Each of the memory cells of the memory device 100 may be configured as an SLC that stores one data bit, an MLC that stores two data bits, a TLC that stores three data bits, or a QLC that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address of the received address ADDR. The address decoder 121 may select at least one word line among word lines of a selected memory block according to the decoded row address. The address decoder 121 may apply an operation voltage Vop received from the voltage generator 122 to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may be configured to decode a column address of the transferred address ADDR. The decoded column address may be transferred to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of programming, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL1 to BLm and store the read data DATA in the first to m-th page buffers PB1 to PBm.

During the erase operation, the read and write circuit 123 may float the bit lines BL1 to BLm. In an embodiment, the read and write circuit 123 may include a column select circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the allowable bit VRYBIT in response to the command CMD and the address ADDR. The control logic 130 may output the operation signal OPSIG to the voltage generator 122, output the address ADDR to the address decoder 121, output the read and write control signal PBSIGNALS to the read and write circuit 123, and output the allowable bit VRYBIT to the sensing circuit 125. In addition, the control logic 130 may determine whether the verify operation has passed or failed in response to the pass or fail signal PASS/FAIL output by the sensing circuit 125.

Figure 3:
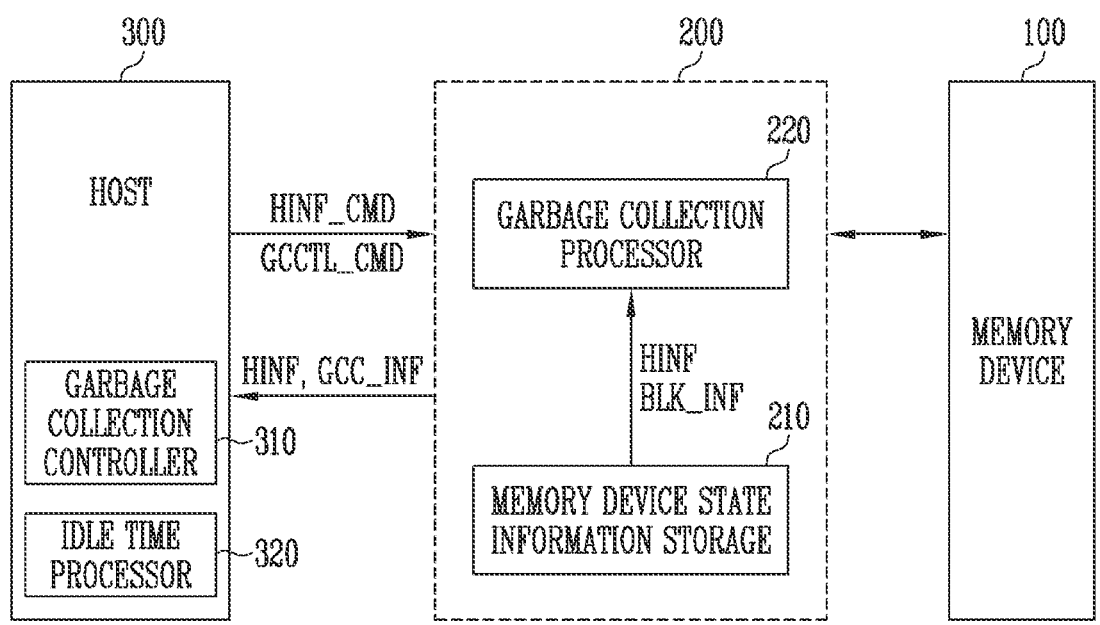
FIG. 3 is a diagram illustrating a configuration and an operation of a host and a memory controller of FIG. 1 according to an embodiment of the present disclosure.

FIG. 3 is a diagram illustrating a configuration and an operation of the host and the memory controller of FIG. 1 according to an embodiment of the present disclosure.

Referring to FIG. 3, the memory controller 200 may include a memory device state information storage 210 and a garbage collection processor 220.

The memory device state information storage 210 may store health information HINF and memory block information BLK_INF.

The health information HINF may include the host write amount and the storage device write amount. The host write amount may be the amount of the data corresponding to the write command provided from the host 300 to the memory controller 200. The storage device write amount may be the amount of the data corresponding to the write operation performed in the memory device 100. The health information HINF may include the host read amount, the storage device read amount, and the busy time of the storage device. The host read amount may be the amount of the data corresponding to the read command provided from the host 300 to the memory controller 200. The storage device read amount may be the amount of the data corresponding to the read operation performed in the memory device 100.

The memory block information BLK_INF may include the information on the plurality of memory blocks included in the memory device 100. The memory block information BLK_INF may include the number of pages storing the invalid data among the plurality of pages included in the memory block.

The garbage collection processor 220 may provide the health information HINF to the garbage collection controller 310 in response to a health information request command HINF_CMD received from the garbage collection controller 310. The garbage collection processor 220 may provide the garbage collection cost information GCC_INF to the garbage collection controller 310 in response to a first garbage collection control command GCCTL_CMD received from the garbage collection controller 310. The garbage collection cost information GCC_INF may include the expected number of free blocks to be secured through the garbage collection among the plurality of memory blocks and the expected time of the garbage collection. The garbage collection processor 220 may calculate the expected number of free blocks and the expected time based on the invalid data page count included in the memory block information BLK_INF. The garbage collection processor 220 may perform the garbage collection on the memory device 100 in response to the second garbage collection control command GCCTL_CMD received from the garbage collection controller 310.

The health information request command HINF_CMD may include the get parameter command for requesting the register information of the memory device 100. The first and second garbage collection control commands GCCTL_CMD may include the set parameter command for setting the register information of the memory device 100.

The host 300 may include a garbage collection controller 310 and an idle time processor 320.

The garbage collection controller 310 may provide the health information request command HINF_CMD for requesting the health information HINF including the host write amount and the storage device write amount to the garbage collection processor 220. The garbage collection controller 310 may predict the garbage collection demand of the storage device based on the health information HINF. When the storage device write amount is greater than the host write amount, the garbage collection controller 310 may recognize the garbage collection demand. In a case where the storage device write amount is greater than the host write amount, the case may indicate that a large number of write operations are internally performed in the storage device 50, which causes an increase of the number of invalid data pages, and thus the case may indicate that the garbage collection is highly required to be performed. When the garbage collection demand is recognized, the garbage collection controller 310 may provide the first garbage collection control command GCCTL_CMD for requesting the garbage collection cost information GCC_INF to the garbage collection processor 220.

The garbage collection controller 310 may provide the second garbage collection control command GCCTL_CMD for instructing to perform the garbage collection based on the garbage collection cost information GCC_INF and the idle time of the memory device 100 to the garbage collection processor 220. The garbage collection controller 310 may provide the second garbage collection control command GCCTL_CMD to the garbage collection processor 220 based on the comparison result of the garbage collection unit time and the idle time of the memory device 100. The garbage collection unit time may be the expected time required to secure one free block. The garbage collection unit time may be calculated based on the expected number of free blocks and the expected time included in the garbage collection cost information GCC_INF. When the idle time is greater than the garbage collection unit time, the garbage collection controller 310 may provide the second garbage collection control command GCCTL_CMD to the garbage collection processor 220. The garbage collection controller 310 may calculate the number of target free blocks to be secured through the garbage collection based on the comparison result of the garbage collection unit time and the idle time of the memory device 100. The garbage collection controller 310 may provide the information including the number of target free blocks and the second garbage collection control command GCCTL_CMD to the garbage collection processor 220.

The idle time processor 320 may process the information on the idle time of the memory device 100. Specifically, the idle time processor 320 may collect and update the information on the idle time and calculate the idle time based on the information on the idle time. The information on the idle time may include the information on the input and output command provided to the memory controller 200. The information on the idle time may include the information generated based on the host write amount, the storage device write amount, the host read amount, the storage device read amount, and the busy time of the storage device included in the health information. The idle time of the memory device 100 may be the time in which all operations according to the request of the host 300 are completed and the memory controller 200 waits for the reception of the request of the host 300. Specifically, the idle time may be a time in which the storage device waits for reception of a command from the host without performing an operation according to a command requested by the host. The idle time processor 320 determines whether the storage device performs an operation according to the request of the host or an internal operation according to the need of the storage device through the host write amount, the storage device write amount, the host read amount, the storage device read amount, and the busy time of the storage device. Accordingly, the idle time processor 320 may calculate a time during which the storage device waits for a host request or performs an internal operation without performing an operation according to the host request as the idle time.

Figure 4:
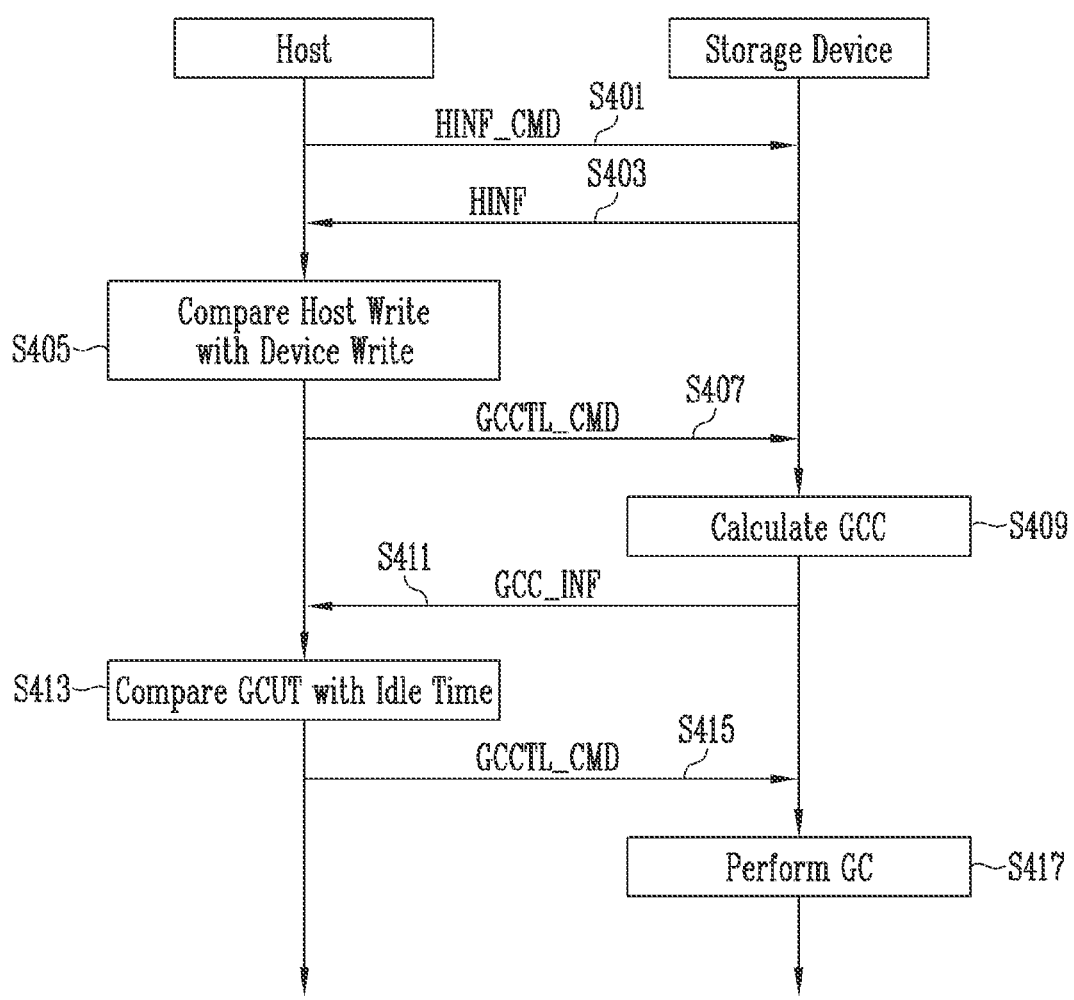
FIG. 4 is a flowchart illustrating an operations of a host and a storage device according to an embodiment of the present disclosure.

FIG. 4 is a flowchart illustrating an operations of a host and a storage device according to an embodiment of the present disclosure.

Referring to FIG. 4, in operation S401, the host may provide the health information request command HINF_CMD to the storage device.

In operation S403, the storage device may provide the health information HINF including the storage device write amount and the host write amount to the host. The host write amount may be the amount of the data corresponding to the write command provided to the storage device. The storage device write amount may be the amount of the data corresponding to the write operation performed inside the storage device.

In operation S405, the host may compare the storage device write amount and the host write amount. As a result of the comparison, when the storage device write amount is greater than the host write amount, the host may recognize the garbage collection demand for the storage device. In a case where the storage device write amount is greater than the host write amount, the case may indicate that a large number of write operations are internally performed in the storage device 50, which causes an increase of the number of invalid data pages, and thus the case may indicate that the garbage collection is highly required to be performed.

In operation S407, when the garbage collection demand is recognized, the host may provide the first garbage collection control command GCCTL_CMD for requesting the garbage collection cost information GCC_INF to the storage device.

In operation S409, the storage device may calculate a garbage collection cost GCC in response to the first garbage collection control command GCCTL_CMD. The storage device may calculate the expected number of free blocks to be secured through the garbage collection and the expected time of the garbage collection based on the invalid data page count included in the memory blocks.

In operation S411, the storage device may provide the garbage collection cost information GCC_INF to the host. The garbage collection cost information GCC_INF may include the expected number of free blocks to be secured through the garbage collection among the plurality of memory blocks and the expected time of the garbage collection.

In operation S413, the host may compare the garbage collection unit time GCUT with the idle time Idle Time of the storage device. The garbage collection unit time may be the expected time required to secure one free block. The garbage collection unit time may be calculated based on the expected number of free blocks and the expected time included in the garbage collection cost information GCC_INF.

In operation S415, when the idle time Idle Time is greater than the garbage collection unit time GCUT, the host may provide the second garbage collection control command GCCTL_CMD to the storage device. The host may calculate the number of target free blocks to be secured through the garbage collection based on the comparison result of the garbage collection unit time GCUT and the idle time Idle Time. The host may provide the information including the number of target free blocks and the second garbage collection control command GCCTL_CMD to the storage device.

In operation S417, the storage device may perform the garbage collection in response to the second garbage collection control command GCCTL_CMD received from the host.

FIG. 5 is a diagram illustrating health information according to an embodiment of the present disclosure.

Referring to FIG. 5, the health information HINF may include a host write amount Host Write and a storage device write amount Device Write. The host write amount Host Write may be the amount of the data corresponding to the write command provided from the host to the storage device. The host write amount Host Write may be the amount of the data requested by the host to write to the storage device.

The storage device write amount Device Write may be the amount of the data corresponding to the write operation performed in the storage device. The storage device write amount Device Write may include the amount of the data according to the write operation performed inside the storage device separately from the request of the host.

FIG. 6 is a diagram illustrating a smart health information log according to an embodiment of the present disclosure.

Referring to FIG. 6, the smart health information log may be an embodiment of the health information of FIG. 5. A byte may be a bit value indicating each field. The number of fields and a byte value corresponding to the field are not limited to the present embodiment. In FIG. 6, only some fields among all fields are shown in the smart health information log, and other fields may also be included.

Data Unit Read may include the number of 512 bytes of data units read from the controller by the host, excluding meta data. Data Unit Written may include the number of 512 bytes of data units written to the controller by the host, excluding the meta data. Host Read Commands may include the number of read commands completed by the controller. Host Write Commands may include the number of write commands completed by the controller. Controller Busy Time may include an amount of a time when the controller is in a busy state by the input and output command.

FIG. 7 is a diagram illustrating a garbage collection control command according to an embodiment of the present disclosure.

Referring to FIG. 7, the garbage collection control command GCCTL_CMD may instruct return of the garbage collection cost information GCC_INF or performance of the garbage collection according to a value. For example, when the value is 0, the garbage collection control command GCCTL_CMD may be a command for requesting the storage device to return the garbage collection cost information GCC_INF. When the value is 1, the garbage collection control command GCCTL_CMD may be a command for instructing the storage device to perform the garbage collection. The garbage collection control command may be the set parameter command for setting the register information of the storage device.

Figure 8A:
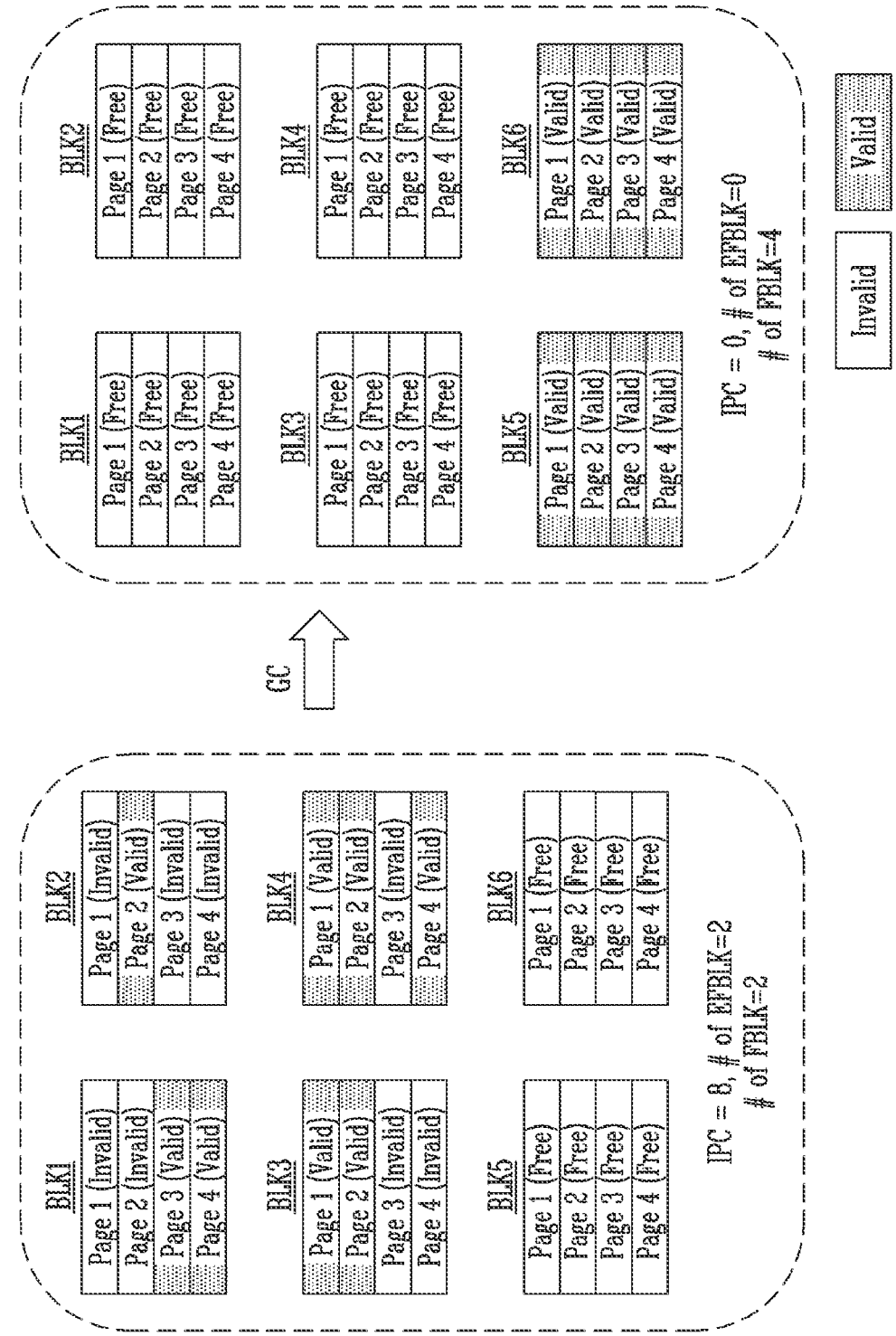
FIG. 8A is a diagram illustrating the expected number of free blocks according to an embodiment of the present disclosure.

FIG. 8A is a diagram illustrating the expected number of free blocks according to an embodiment of the present disclosure.

Referring to FIG. 8A, a memory block pool may include first to sixth memory blocks BLK1 to BLK6. Each memory block may include four pages. The number of memory blocks included in the memory block pool and the number of pages included in each memory block are not limited to the present embodiment.

Invalid page data may be erased through garbage collection GC, and valid page data may be moved and stored in another memory block. For example, valid page data stored in the first to fourth memory blocks BLK1 to BLK4 may be copied to the fifth and sixth memory blocks BLK5 and BLK6 which are free blocks. Thereafter, the first to fourth memory blocks BLK1 to BLK4 may be erased and used as free blocks.

An invalid data page count IPC may be the number of pages storing invalid data included in the memory blocks. In FIG. 8A, since the invalid data page count IPC is 8 and 4 pages are included in one memory block, it may be expected that 8/4=2 free blocks are secured through the garbage collection.

Therefore, before the garbage collection GC, the number of free blocks may be two, and the expected number of free blocks may be two. After the garbage collection GC, the number of free blocks may be four, and the expected number of free blocks may be zero. Therefore, two free blocks may be additionally secured through the garbage collection GC.

Figures 8B, 9:
FIG. 8B is a diagram illustrating a free block calculation table for determining the expected number of free blocks according to an embodiment of the present disclosure.
FIG. 9 is a diagram illustrating garbage collection based on garbage collection cost information according to an embodiment of the present disclosure.

FIG. 8B is a diagram illustrating a free block calculation table for determining the expected number of free blocks according to an embodiment of the present disclosure.

Referring to FIG. 8B, the expected number of free blocks EFBLK may be determined according to an invalid data page count IPC value X. For example, when X is greater than or equal to Y1 and less than Y2, the expected number of free blocks may be determined to be Z1. When X is greater than or equal to Y2 and less than Y3, the expected number of free blocks may be determined to be Z2. Similarly, when X is greater than or equal to Yn and less than Y(n+1), the expected number of free blocks may be determined to be Zn.

In an embodiment, values of Y1 to Y(n+1) and Z1 to Zn may include preset values in a manufacturing process step. In another embodiment, the values of Y1 to Y(n+1) and Z1 to Zn may be periodically or non-periodically updated according to an environment of the storage device.

An example of the free block calculation table is not limited to the present embodiment, and the expected number of free blocks may be determined based on a value obtained by substituting the value of X into a preset equation or an equation that varies according to the environment of the storage device.

FIG. 9 is a diagram illustrating the garbage collection based on the garbage collection cost information GCC_INF according to an embodiment of the present disclosure.

Referring to FIG. 9, the expected number of free blocks to be secured through the garbage collection may be ten. The expected time required for the garbage collection may be 5. A unit of a time may be set variously according to performance and the environment of the storage device. A garbage collection unit time may be 5/10=0.5. That is, a time of 0.5 may be required to secure one free block through the garbage collection.

The number of target free blocks to be secured through the garbage collection may be calculated based on a result of comparing the garbage collection unit time and the idle time of the storage device. For example, when the idle time of the storage device is 0.2, which is less than the garbage collection unit time, the number of target free blocks may be zero. In this case, the host may not provide a command for instructing the storage device to perform the garbage collection.

When the idle time of the storage device is 0.7, which is greater than the garbage collection unit time, the number of target free blocks may be one. The host may provide the command for instructing to perform the garbage collection and information including the number of target free blocks to the storage device. The storage device may perform the garbage collection to secure as much as the number of target free blocks. When the idle time of the storage device is 10, which is greater than the garbage collection unit time, the number of target free blocks may be 10. The host may provide the command for instructing to perform the garbage collection and the information including the number of target free blocks to the storage device.

According to an embodiment, even though 10 free blocks may be secured when performing the entire garbage collection, the host may instruct the storage device to secure the optimized number of free blocks in consideration of the idle time of the storage device. Accordingly, the free block may be preemptively secured within a range in which performance of the storage device is not degraded.

Figure 10:
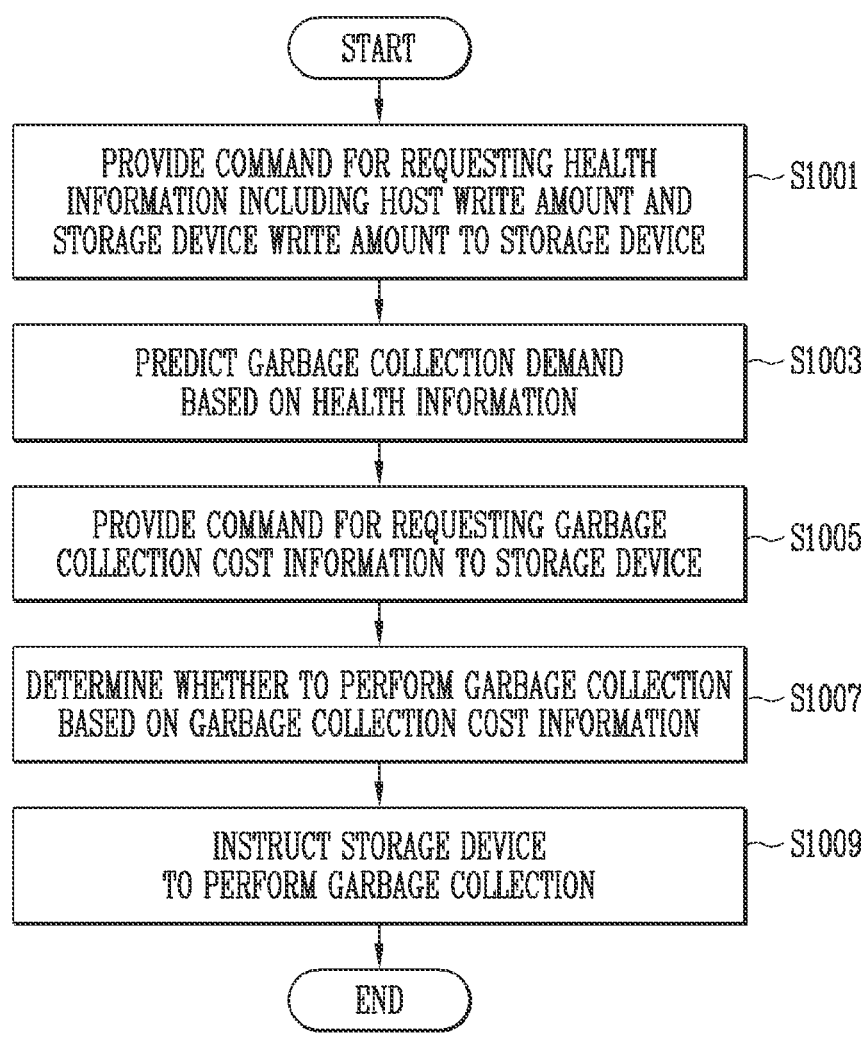
FIG. 10 is a flowchart illustrating a method of operating a host according to an embodiment of the present disclosure.

FIG. 10 is a flowchart illustrating a method of operating a host according to an embodiment of the present disclosure.

Referring to FIG. 10, in operation S1001, the host may provide a command for requesting the health information including the host write amount and the storage device write amount to the storage device.

In operation S1003, the host may predict the garbage collection demand based on the health information.

In operation S1005, when the garbage collection demand is recognized, the host may provide a command for requesting the garbage collection cost information GCC_INF to the storage device.

In operation S1007, the host may determine whether to perform the garbage collection based on the garbage collection cost information GCC_INF.

In operation S1009, the host may instruct the storage device to perform the garbage collection. At this time, the host may provide the information including the number of target free blocks to be secured through the garbage collection to the storage device.

Figure 11:
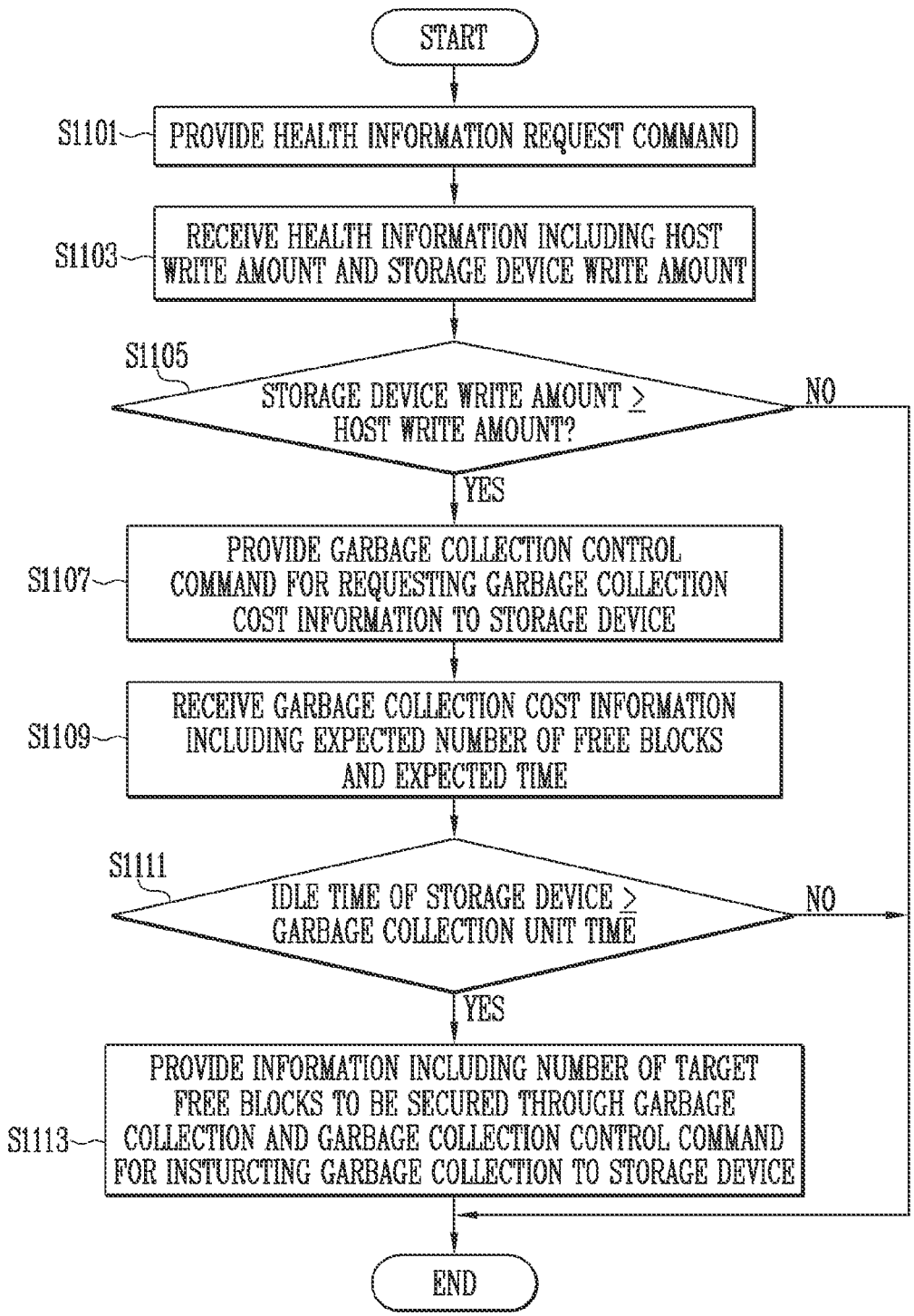
FIG. 11 is a flowchart illustrating a method of operating a host according to an embodiment of the present disclosure.

FIG. 11 is a flowchart illustrating a method of operating a host according to an embodiment of the present disclosure.

Referring to FIG. 11, in operation S1101, the host may provide the health information request command to the storage device.

In operation S1103, the host may receive the health information including the host write amount and the storage device write amount.

In operation S1105, the host may determine whether the storage device write amount is greater than or equal to the host write amount. When the storage device write amount is greater than or equal to the host write amount, the operation proceeds to operation S1107. When the storage device write amount is less than the host write amount, the operation may be ended. In a case where the storage device write amount is greater than the host write amount, the case may indicate that a large number of write operations are internally performed in the storage device, which causes an increase of the number of invalid data pages, and thus the case may indicate that the garbage collection is highly required to be performed.

In operation S1107, the host may provide the garbage collection control command for requesting the garbage collection cost information GCC_INF to the storage device.

In operation S1109, the host may receive the garbage collection cost information GCC_INF including the expected number of free blocks and the expected time from the storage device.

In operation S1111, the host may determine whether the idle time of the storage device is longer than the garbage collection unit time. When the idle time is longer than or equal to the garbage collection unit time, the operation proceeds to operation S1113. When the idle time is shorter than the garbage collection unit time, the operation is ended. The garbage collection unit time may be an expected time required to secure one free block.

In operation S1113, the host may provide the information including the number of target free blocks to be secured through the garbage collection and the garbage collection control command for instructing the garbage collection to the storage device.

Figure 12:
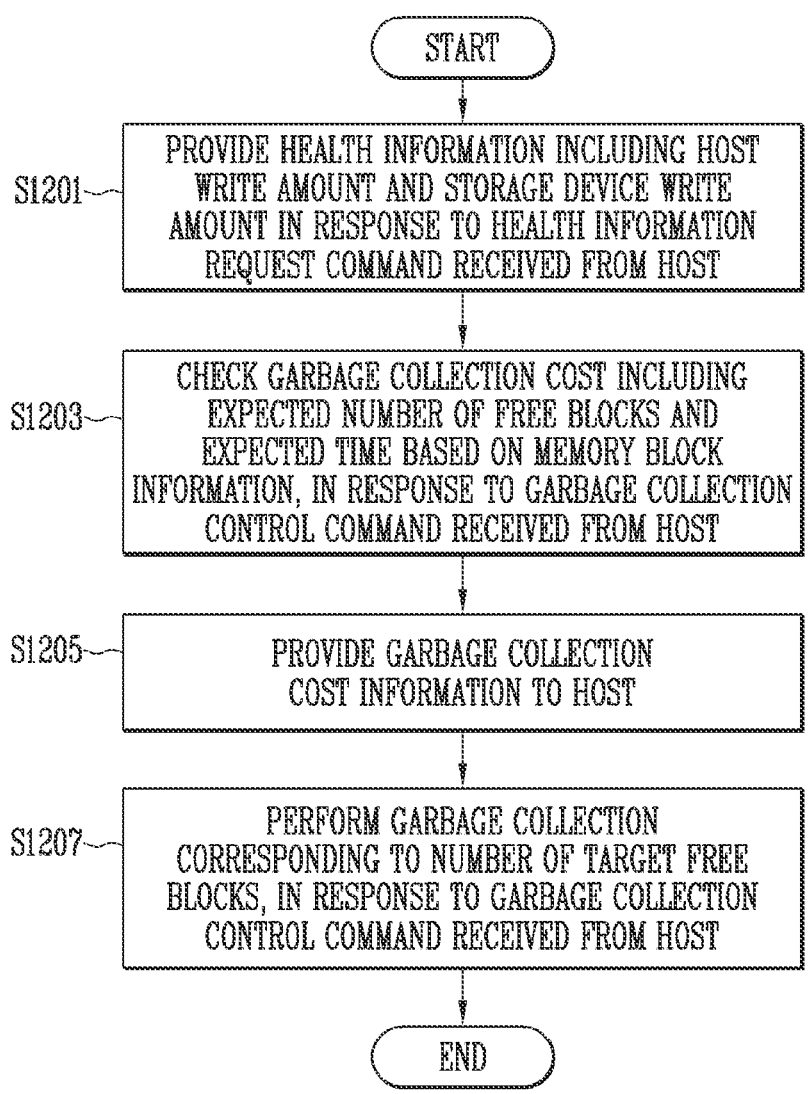
FIG. 12 is a flowchart illustrating a method of operating a storage device according to an embodiment of the present disclosure.

FIG. 12 is a flowchart illustrating a method of operating a storage device according to an embodiment of the present disclosure.

Referring to FIG. 12, in operation S1201, the storage device may provide the health information including the host write amount and the storage device write amount to the host in response to the health information request command received from the host.

In operation S1203, the storage device may check the garbage collection cost including the expected number of free blocks and the expected time based on the invalid data page count included in the memory block information in response to the garbage collection control command received from the host. Specifically, the storage device may determine the expected number of free blocks based on the invalid data page count and a value stored in the free block calculation table. When the expected number of free blocks is determined, the storage device may determine an expected time corresponding to the expected number of free blocks based on a preset time value or a time value updated according to the environment of the storage device.

In operation S1205, the storage device may provide the garbage collection cost information GCC_INF to the host.

In operation S1207, the storage device may perform the garbage collection corresponding to the number of target free blocks in response to the garbage collection control command received from the host.

Figure 13:
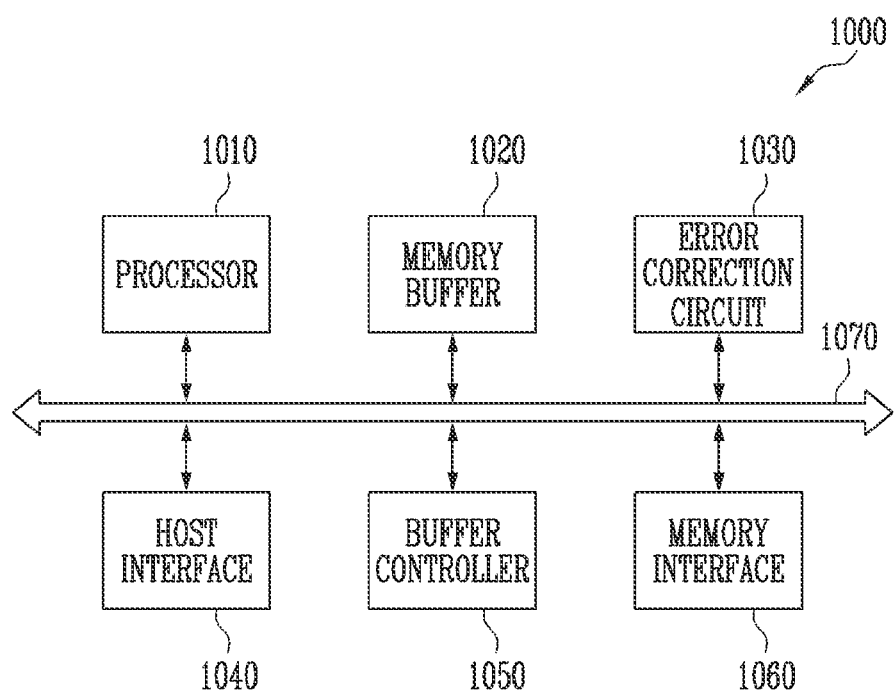
FIG. 13 is a diagram illustrating a memory controller of FIG. 1 according to another embodiment of the present disclosure.

FIG. 13 is a diagram illustrating the memory controller of FIG. 1 according to another embodiment of the present disclosure.

Referring to FIG. 13, the memory controller 1000 is connected to the host and the memory device. The memory controller 1000 is configured to access the memory device in response to the request from the host. For example, the memory controller 1000 is configured to control the write, read, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction circuit (ECC) 1030, a host interface 1040, a buffer control controller 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of an FTL. The processor 1010 may convert an LBA provided by the host into a PBA through the FTL. The FTL may receive the LBA using a mapping table and convert the LBA into the PBA. An address mapping method of the flash translation layer may include various methods according to a mapping unit. A representative address mapping method includes a page mapping method, a block mapping method, and a hybrid mapping method.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with an external host under control of the processor 1010. The host interface 1040 may be configured to perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1020, and the memory interface 1060.

Figure 14:
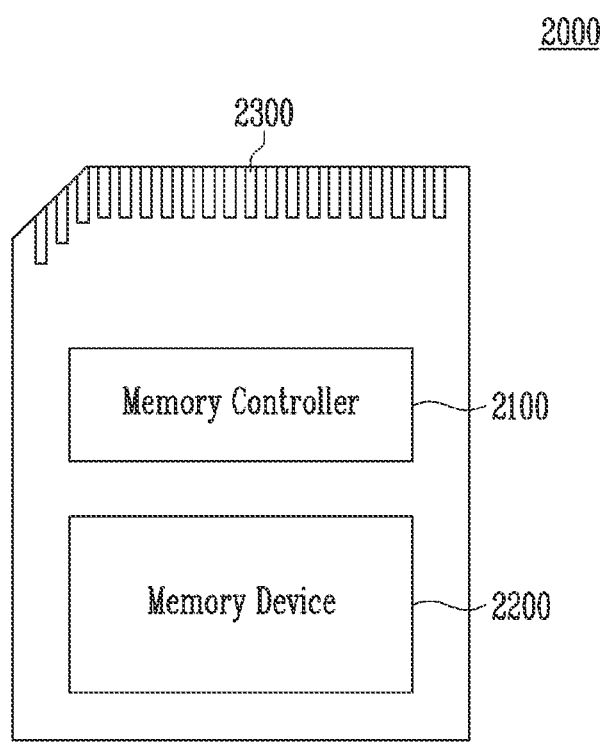
FIG. 14 is a block diagram illustrating a memory card system to which a storage device according to an embodiment of the present disclosure is applied.

FIG. 14 is a block diagram illustrating a memory card system to which a storage device according to an embodiment of the present disclosure is applied.

Referring to FIG. 14, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-E), advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards or interfaces described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 15:
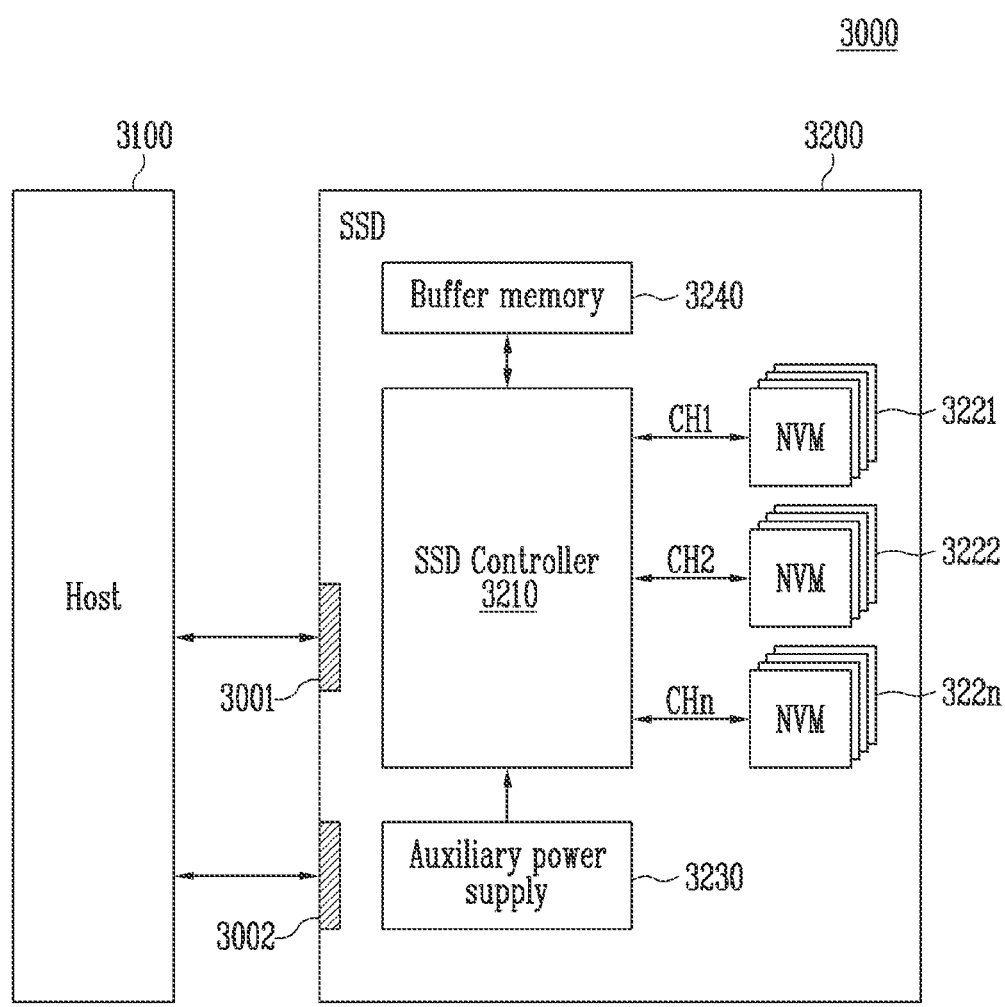
FIG. 15 is a block diagram illustrating a solid state drive (SSD) system to which a storage device according to an embodiment of the present disclosure is applied.

FIG. 15 is a block diagram illustrating a solid state drive (SSD) system to which a storage device according to an embodiment of the present disclosure is applied.

Referring to FIG. 15, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may communicate with the plurality of flash memories 3221 to 322n through the plurality of channels CH1 to CHN and control the plurality of flash memories 3221 to 322n in response to the signal received from the host 3100. The plurality of flash memories 3221 to 322n may include the non-volatile memory (NVM). For example, the signal may be signals based on an interface between the host 3100 and the SSD 3200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power from the host 3100 and may charge the power. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 16:
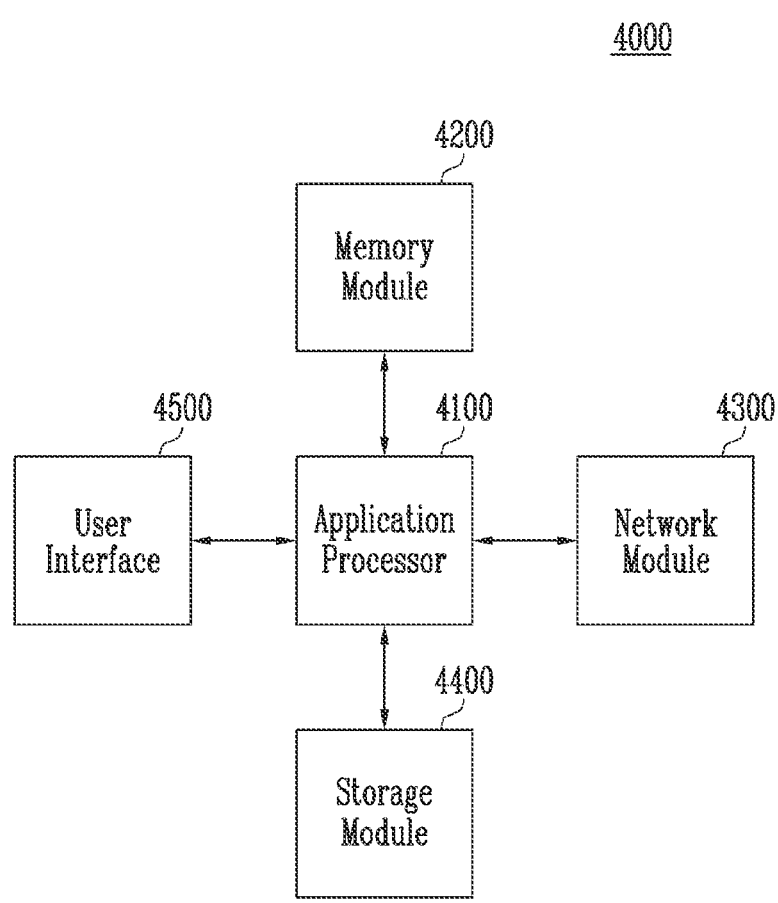
FIG. 16 is a block diagram illustrating a user system to which a storage device according to an embodiment of the present disclosure is applied.

FIG. 16 is a block diagram illustrating a user system to which a storage device according to an embodiment of the present disclosure is applied.

Referring to FIG. 16, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (Soc).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, or an LPDDR3 SDRAM, or a non-volatile random access memory such as a PRAM, a ReRAM, an MRAM, or an FRAM. For example, the application processor 4100 and the memory module 4200 may be packaged based on a package on package (POP) and provided as a single semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although the technical spirit of the present disclosure has been specifically described according to the above embodiments, it should be noted that the above embodiments are for description, not for limitation. Furthermore, those who skilled in the art will understand that various embodiments can be made within the scope of the technical spirit of the present disclosure and the following claims. Moreover, the embodiments may be combined to form additional embodiments.

What is claimed is:

1. A host device comprising:
a garbage collection controller configured to:
provide, to a storage device, a health information request command for requesting health information including a host write amount and a storage device write amount,
provide, to the storage device, a first garbage collection control command for requesting garbage collection cost information based on the health information, and
provide, to the storage device, a second garbage collection control command for instructing to perform garbage collection based on the garbage collection cost information and an idle time of the storage device; and
an idle time processor configured to process information based on the idle time.

2. The host device of claim 1,
wherein the host write amount is an amount of data corresponding to a write command provided to the storage device from the host, and
wherein the storage device write amount is an amount of data corresponding to a write operation performed in the storage device.

3. The host device of claim 2, wherein the garbage collection controller provides the first garbage collection control command to the storage device when the storage device write amount is greater than the host write amount.

4. The host device of claim 1, wherein the garbage collection cost information includes an expected number of free blocks to be secured by the garbage collection and an expected time required for the garbage collection.

5. The host device of claim 4, wherein the garbage collection controller provides the second garbage collection control command to the storage device based on a result of comparing the idle time with a garbage collection unit time calculated based on the expected number of free blocks and the expected time.

6. The host device of claim 5, wherein the garbage collection controller is further configured to provide the second garbage collection control command to the storage device when the idle time is greater than the garbage collection unit time.

7. The host device of claim 5, wherein the garbage collection controller is further configured to calculate a number of target free blocks to be secured by the garbage collection based on the comparison result, and provide, to the storage device and together with the second garbage collection control command, information including the number of target free blocks.

8. The host device of claim 1,
wherein the health information request command includes a get parameter command for requesting register information of the storage device, and
wherein the first and second garbage collection control commands include a set parameter command for setting the register information.

9. The host device of claim 1,
wherein the health information includes a host read amount which is an amount of data corresponding to a read command provided to the storage device from the host, a storage device read amount which is an amount of data corresponding to a read operation performed in the storage device, and a busy time of the storage device, and
wherein the idle time processor calculates the idle time based on at least one of the health information and the information based on the idle time including an input and output command provided to the storage device.

10. A method of operating a host device, the method comprising:
providing, to a storage device, a health information request command for requesting health information including a host write amount and a storage device write amount;
providing, to the storage device, a first garbage collection control command for requesting garbage collection cost information based on the health information received from the storage device; and
providing, to the storage device, a second garbage collection control command instructing to perform garbage collection based on the garbage collection cost information and an idle time of the storage device.

11. The method of claim 10, further comprising calculating the idle time based on an input and output command provided to the storage device,
wherein the idle time represents time from when the host device receives a response of a last command from the storage device to when the host device sends a request of a new next command to the storage device.

12. The method of claim 10,
wherein the host write amount is an amount of data corresponding to a write command provided to the storage device, and
wherein the storage device write amount is an amount of data corresponding to a write operation performed in the storage device.

13. The method of claim 12, wherein the first garbage collection control command is provided when the storage device write amount is greater than the host write amount.

14. The method of claim 10, wherein the garbage collection cost information represents an expected number of free blocks to be secured through the garbage collection and an expected time required for the garbage collection.

15. The method of claim 14, wherein the second garbage collection control command is provided based on a result of comparing the idle time with a garbage collection unit time calculated based on the expected number of free blocks and the expected time.

16. The method of claim 15, further comprising:
calculating a number of target free blocks to be secured through the garbage collection based on the comparison result; and
providing, to the storage device and together with the second garbage collection control command, information representing the number of target free blocks.

17. A storage device comprising:
a memory device including a plurality of memory blocks; and
a memory controller configured to
provide, in response to a health information request command from an external device, the external device with health information including an external device write amount and a storage device write amount, provide, in response to a first garbage collection control command from the external device, the external device with garbage collection cost information including an expected number of free blocks to be secured by garbage collection, and perform the garbage collection on the memory device in response to a second garbage collection control command from the external device.

18. The storage device of claim 17,
wherein the external device write amount is an amount of data corresponding to a write command provided from the external device to the memory controller, and
wherein the storage device write amount is an amount of data corresponding to a write operation performed in the memory device.

19. The storage device of claim 17, wherein the memory controller comprises:
a memory device state information storage configured to store memory block information on the plurality of memory blocks and the health information and including a free block calculation table; and
a garbage collection processor configured to determine the expected number of free blocks based on an invalid data page count and the free block calculation table.

20. The storage device of claim 17,
wherein the health information request command includes a get parameter command for requesting register information of the storage device, and
wherein the first and second garbage collection control commands include a set parameter command for setting the register information.

* * * * *